United States Patent [19]

Allen et al.

[11] 4,121,290
[45] Oct. 17, 1978

[54] ANALOG SOUND VELOCITY CALCULATOR

[75] Inventors: Royce Allen, Centerville, Utah; Jerry L. Sutton, San Diego, Calif.; Dan M. Griffin, San Diego, Calif.; Hal W. Frye, San Diego, Calif.; Joseph G. Colborn, San Diego, Calif.

[73] Assignee: The United States of America as represented by the Secretary of the Navy, Washington, D.C.

[21] Appl. No.: 788,371

[22] Filed: Apr. 18, 1977

[51] Int. Cl.² .................. G06G 7/78; G01H 5/00; H04B 13/00
[52] U.S. Cl. .................. 364/565; 73/170 A; 73/645; 340/55; 364/423; 73/597
[58] Field of Search .................. 235/151.3, 151.32; 73/560, 170 R, 170 A, 189, 194 A; 340/3 R, 3 E, 4 R, 55; 181/110, 120, 0.5; 33/126; 364/565, 808

[56] References Cited

U.S. PATENT DOCUMENTS

| | | | |
|---|---|---|---|
| 3,339,407 | 9/1967 | Campbell et al. | 73/170 A |
| 3,401,560 | 9/1968 | Francis | 73/170 A |
| 3,441,901 | 4/1969 | Cawley et al. | 73/560 X |
| 3,447,371 | 6/1969 | Bennin | 73/170 R |
| 3,842,398 | 10/1974 | Massa | 73/170 A X |

OTHER PUBLICATIONS

Wilson, "Speed of Sound in Sea Water as a Function of Temperature, Pressure, and Salinity", Journal of Acoustical Society of America, vol. 32, No. 10, p. 1357, Oct. 1960.

Wilson, "Equation for the Speed of Sound in Sea Water", J. Acoust. Soc. Am., vol. 32, No. 10, p. 1357, Oct. 1960.

*Primary Examiner*—Joseph F. Ruggiero
*Attorney, Agent, or Firm*—Richard S. Sciascia; Ervin F. Johnston; James O. Skarsten

[57] ABSTRACT

An analog apparatus for determining the velocity of sound at a selected position in a liquid media is provided with a means for representing the conductivity, temperature, and depth of the position in the form of analog voltages, and is further provided with an analog calculating means receiving each of the voltages for calculating the velocity of sound as a function of conductivity, temperature, and depth. The sound velocity may be calculated at a succession of positions to provide a sound velocity versus depth profile of the liquid media.

12 Claims, 8 Drawing Figures

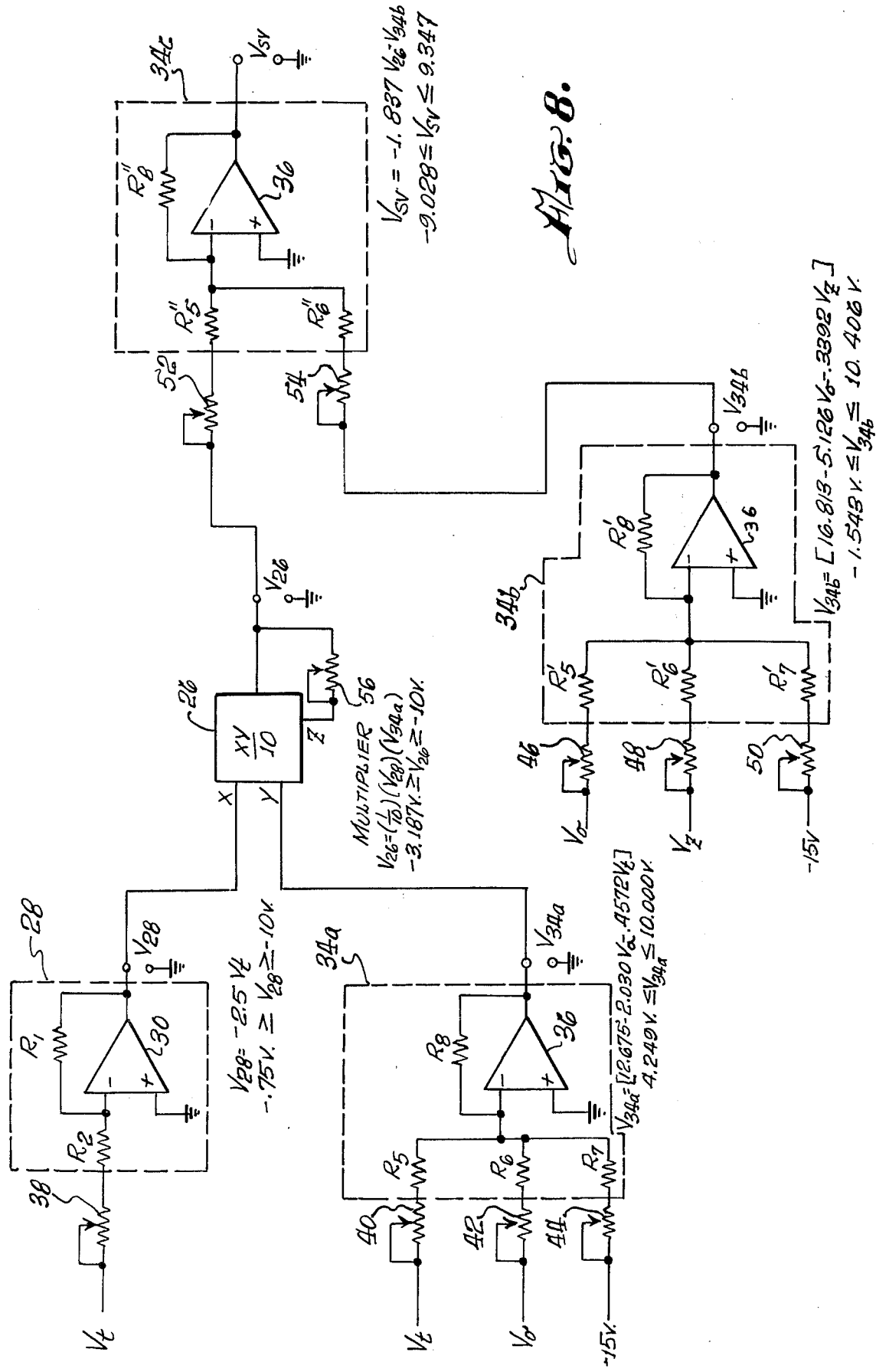

ANALOG SOUND VELOCITY CALCULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to an apparatus for calculating the velocity of sound in a liquid media, and more particularly pertains to such apparatus wherein analog electronic means are employed to calculate sound velocity as a function of conductivity, temperature, and depth.

To effectively employ sonar equipments, as well as to accomplish numerous other activities involving acoustic transmissions in seawater, it is very important to determine the velocity of sound in seawater. A most useful form for such information is a real-time profile of sound velocity versus depth, which may indicate, for example, the refractive effects on sonar waves of different layers of seawater, or the flow of currents through the different layers. As is well known, the velocity of sound at a selected position in seawater is affected by both the temperature and the salinity thereof.

In the past, temperature probes or other thermometric devices have been employed to provide a sound velocity profile by measuring the temperature at various depths in an ocean body. More recently, probes have been used which provides salinity as well as temperature data. Obtaining a profile from such data, however, may require reference to tables and time-consuming computations, whereby the profile is not in real time.

In other types of prior art devices, sound velocity in an ocean media may be directly measured by immersing an active signal producing device in the media, the device radiating signals which are functionally related to the sound velocity at positions through which it passes. In addition to possible errors due to Doppler shift, such active systems may be unsuitable for military purposes where the radiated signals are subject to detection by an unfriendly observer.

SUMMARY OF THE INVENTION

The present invention discloses an apparatus for determining the velocity of sound at a selected position in a liquid media, such as an ocean body, wherein means are provided for representing variables, comprising the conductivity, temperature and depth of the selected position, in the form of analog voltages, the conductivity of a given position being proportional to the salinity thereof. The invention further provides analog calculating means which receives each of the analog voltages, and calculates the velocity at the selected position as a function of the conductivity, temperature, and depth thereof. Some embodiments of the invention may provide a real-time profile of seawater to a depth of 750 meters in less than 2 minutes, although reference to such embodiments is by no means intended to limit the scope of the invention herein disclosed.

STATEMENT OF THE OBJECTS OF THE INVENTION

An object of the present invention is to provide a new and improved analog apparatus for calculating the velocity of sound at selected positions in a body of seawater or other liquid media.

Another object of the invention is to provide a real-time profile of sound velocity versus depth for a body of seawater or other liquid media wherein accuracy may be substantially improved.

Another object of the invention is to provide a new and improved apparatus for calculating the real-time velocity of sound at a succession of positions in a liquid media by representing sound velocity as a function of the conductivity, temperature, and depth thereof.

These and other objects of the invention will become more readily apparent from the ensuing specification when taken together with the drawings.

BRIEF DESCRIPTION OF THE DRAWINGS

FIG. 8 is a schematic diagram showing a modification of the calculator of FIG. 7.

DESCRIPTION OF THE PREFERRED EMBODIMENT

Figure 1:
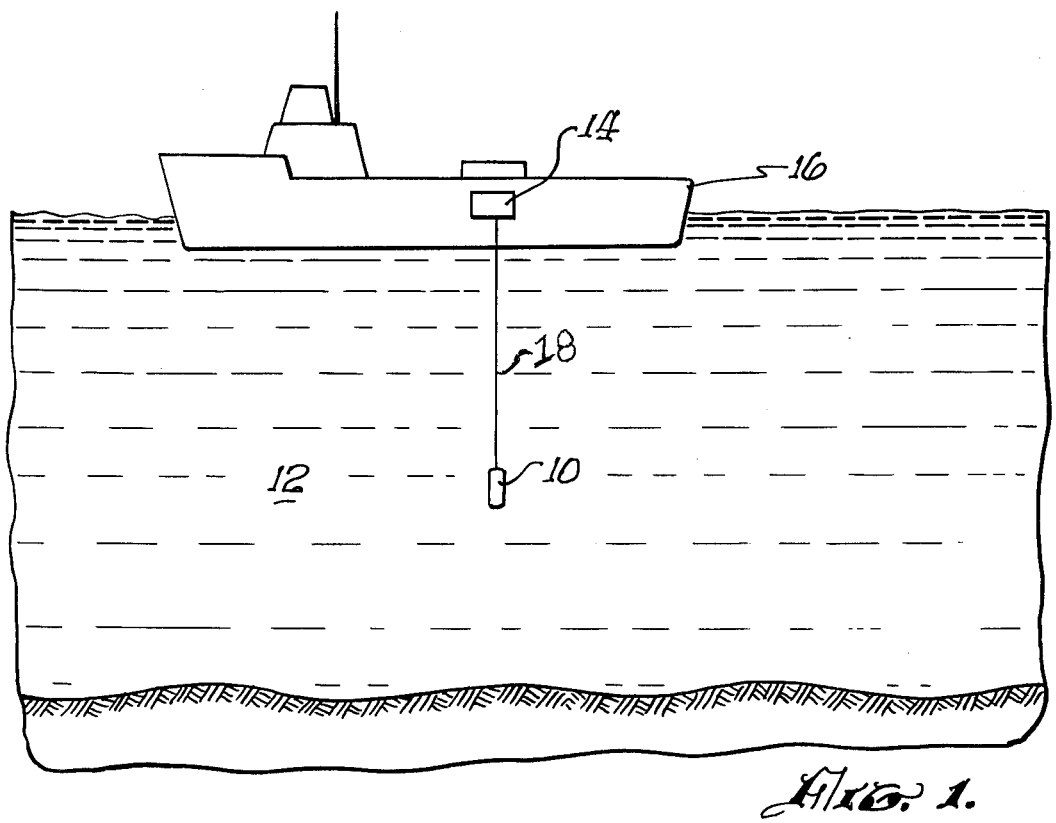
FIG. 1 is a perspective view showing a manner in which an embodiment of the invention may be usefully employed.

Referring to FIG. 1, there is shown sensor 10 dropping at a constant rate through liquid media 12, comprising an ocean body, which senses and couples conductivity, temperature and depth information to analog-calculation-record system 14 aboard vessel 16 through two-conductor wire 18. To provide a real-time profile of the sound velocity of media 12, system 14 determines and records sound velocity at a succession of positions through which sensor 10 passes in its descent, sound velocity being calculated at selected time intervals, such as every 100 milliseconds. It may be noted that successive calculations of sound velocity are entirely passive, i.e. it is unnecessary to radiate signals outward from sensor 10 or vessel 16. Also, calculations account for the salinity of media 12 as well as the temperature thereof, conductivity being functionally related to salinity.

Figure 2:
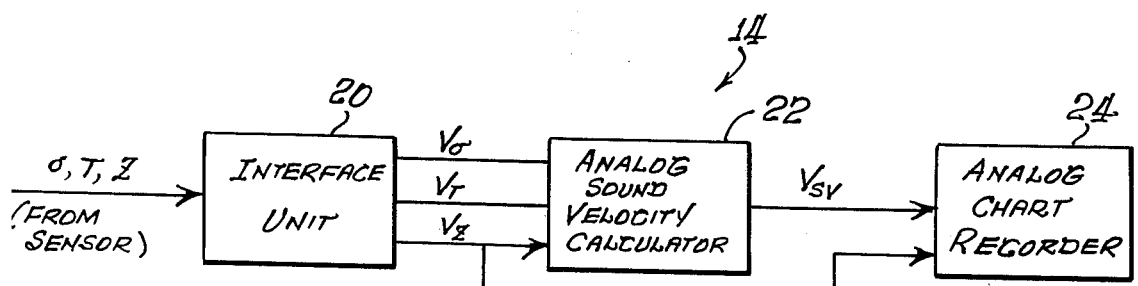
FIG. 2 is a block diagram showing a calculation-record system according to an embodiment of the invention.

Referring to FIG. 2, there is shown interface unit 20 which receives successive values of the variables conductivity, temperature, and depth from sensor 10, and responds thereto by representing each received value in the form of an analog voltage which is proportional thereto, $V_\delta$ being proportional to the conductivity, $\delta$, of media 12, $V_t$ to the temperature, T, thereof and $V_d$ to the depth, Z. Sensor 10 may be an XCTD (Expendable Conductivity Temperature Depth) probe which, together with interface unit 20, comprises a standard sensor/interface system, such as that built by Plessy Environmental Systems.

Each of the analog voltages is coupled to analog sound velocity calculator (ASVC) 22, an electronic analog device structured to calculate the sound velocity of media 12 as a selected function of conductivity, temperature, and depth. The output of ASVC 22 is an analog voltage representing calculated sound velocity and is coupled to an analog chart recorder 24, of any standard type, to provide a graphic profile of sound velocity versus depth in real time.

Figure 3:
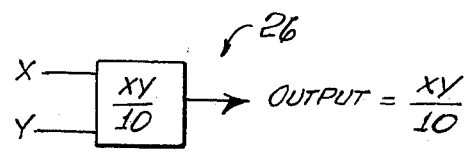
FIG. 3 is a block diagram showing an analog device for multiplying variable voltages.

Referring to FIG. 3, there is shown a multiplier 26, which may receive selected variable voltages X and Y as inputs, and provides an output equal to the product of X and Y divided by some constant, such as 10. Multiplier 26 may comprise any of several conventional devices such as the Function Module type 551 multiplier.

Figures 4, 5:
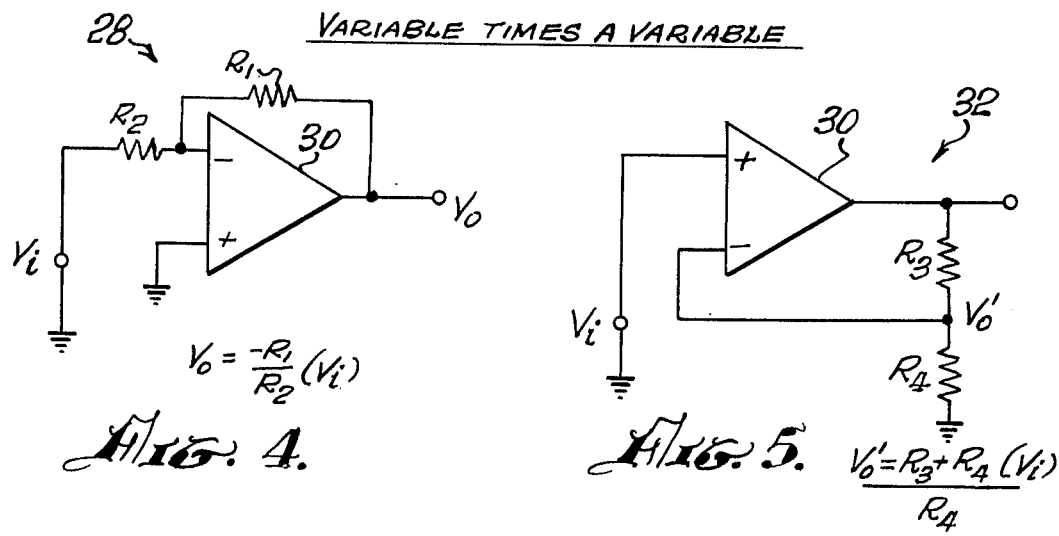
FIGS. 4 and 5 are schematic diagrams, each showing an analog circuit for multiplying a variable voltage and a constant.

Referring to FIG. 4, there is shown a standard analog circuit 28 comprising electronic operational amplifier 30 and resistors $R_1$ and $R_2$ configured to multiply a variable voltage $V_i$ by a constant to provide an output voltage $V_0$. For the configuration of FIG. 4, $V_0 = -R_1/R_2(V_i)$, the value of the constant being determined by the selected values of resistors $R_1$ and $R_2$.

Referring to FIG. 5, there is shown a standard analog circuit 32, also comprising an operational amplifier 30 and resistors $R_3$ and $R_4$ configured in an alternative manner to multiply a variable voltage $V_i$ by a constant to provide an output voltage $V'_0$. For the configuration of FIG. 5, $$V_0 = \frac{R_3 + R_4}{R_4}(V_i),$$

the value of the constant of the circuit shown in FIG. 5 being likewise determined by the selected values of $R_3$ and $R_4$.

Figure 6:
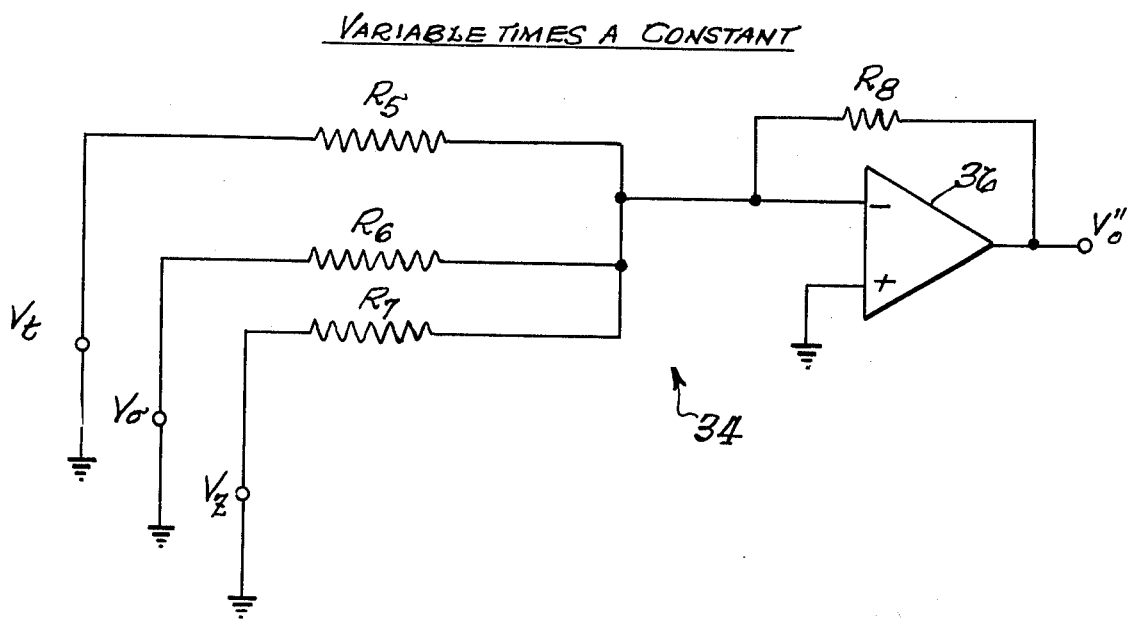
FIG. 6 is a schematic diagram showing an analog circuit for summing variable and constant voltages.

Referring to FIG. 6, there is shown a standard analog circuit 34 comprising analog amplifier 36 and resistors $R_5$, $R_6$, $R_7$ and $R_8$. Analog circuit 34 receives a plurality of voltages and is configured to provide an output voltage $V_0''$, the sum of a plurality of terms, each term formed by multiplying one of the received voltages and a selected constant. For the configuration of FIG. 6 receiving variable voltages $V_\delta$, $V_t$, and $V_z$, $$V_0 = \frac{R_8}{R_5} V_t + \frac{R_8}{R_6} V\sigma + \frac{R_8}{R_7} Vz,$$

the values of the constants being determined by the selected values of $R_5$, $R_6$, $R_7$ and $R_8$.

If C is an analog voltage representing sound velocity at a selected position in media 12, either of the following emperically derived equations may be employed to calculate C from the values of $V_\delta$, $V_t$, $V_z$ of the selected position:

$$C - 1436 = -53.693 + 40.744\, V_t - 1.470\, V_t^2 +$$
$$35.885\, V_\delta - 6.526\, V_t V_\delta + 2.375\, V_z. \quad \text{Eq. (1)}$$

$$C - 1436 = -64.097 + 53.477\, V_t - 4.473\, V_t^2 +$$
$$41.722\, V_\delta - 13.157\, V_t V_\delta + 2.374\, V_z + 1.506\, V_t^2$$
$$V_\delta. \quad \text{Eq. (2)}$$

As aforementioned, $V_\delta$, $V_t$ and $V_z$ are analog voltages proportional to the variables $\delta$, T, and Z respectively, whereby each equation expresses sound velocity as a function of the conductivity, temperature, and depth of media 12. It is anticipated that one skilled in the art could derive other relationships which may also be employed to calculate sound velocity as a function of conductivity, temperature and depth, and therefore, as a function of voltages $V_\delta$, $V_t$, and $V_z$.

Equations (1) and (2) are valid over the following ranges:

1.25 volts $\delta\ V_\delta < 3.25$ volts
0.3 volts $< V_t < 4$ volts
0 volts $< V_z < 5$ volts It will be noted that Equation (1) has a quadratic form and Equation (2) has a cubic form. It may be further noted that Equations (1) and (2) may be solved by arithmetic multiplications and summations of selected analog voltages and selected constants.

Figure 7:
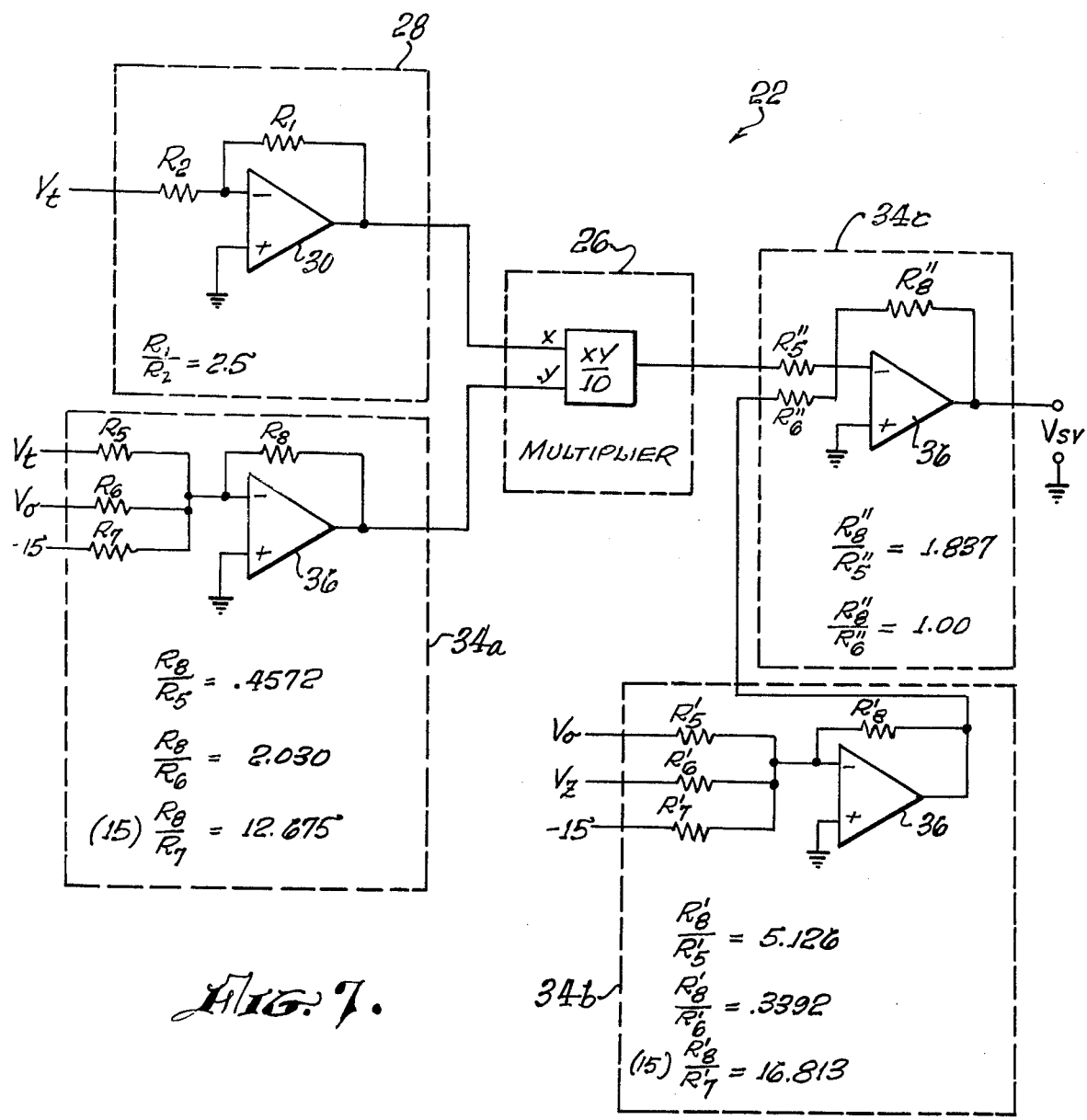
FIG. 7 is a schematic diagram showing an analog sound velocity calculator according to an embodiment of the invention.

Referring to FIG. 7, there is shown ASVC 22 comprising a multiplier 26, an analog circuit 28 and analog circuits 34a, 34b, and 34c, interconnected to implement Equation (1).

The input to circuit 28 comprises $V_t$ and the inputs to circuit 34a comprise $V_t$, $V_\delta$, and a constant voltage −15V, the output of circuit 28 being coupled to the "X" terminal of multiplier 26, and the output of circuit 34a being coupled to the "Y" terminal thereof. The inputs to circuit 34b comprise $V_\delta$, $V_z$ and −15 V, the outputs of multiplier 26 and of circuit 34b comprising the input to circuit 34c.

Parameters for each of the circuits comprising ASVC 22 may be usefully selected to cause multiplier 26 and each of the operational amplifiers 30 and 36 to operate only in their respective linear ranges by scaling Equation (1) according to a scaling relationship, $V_{sv} = (C−a)/b$. If the range for linear operation of multiplier 26 and operational amplifiers 30 and 36 is between −10 and +10 volts, the relationship $V_{sv} = (C − 1500)/7$ may be employed to provide the following scaled equation for calculating sound velocity:

$$V_{sv} = -16.133 + 5.821\, V_t - 0.210 V_t^2 + 5.126\, V_\delta -$$
$$0.932\, V_t V_\delta + 0.339\, V_z. \quad \text{Eq. (3)}$$

where $V_{sv}$, the output of circuit 34c, is an analog voltage representing sound velocity.

If Equation (3) is factored, $V_{sv}$ has the following form:
$$V_{sv} = V_t(5.820 - 0.210 V_t - 0.932\, V\delta) - 16.133 +$$
$$5.126\, V_\delta + 0.399\, V_z \quad \text{Eq. (4)}$$

To illustrate a manner in which the accuracy of ASVC 22 may be improved, it may be assumed that multiplier 26 has an error of, for example, ± 10 mV. To maximize accuracy, Equation (4) is scaled so that the input to the "X" terminal of multiplier 26 is within the range − 0.75 to − 10 volts, and the input to the "Y" terminal of multiplier 26, has a maximum output of +10 volts. If Equation (4) is further scaled to account for the division by 10 of the product of the two inputs to multiplier 26, $V_{sv}$ has the following form:

$$V_{sv} = 1.837(1/10)(-2.5V_t)(12.675 - 0.4572\ V_t -$$
$$2.030\ V - (1)(16.813 - 5.126\, V_\delta - 0.3392\, V_z) \quad \text{Eq. (5)}$$

To calculate $V_{sv}$, Equation (5), comprising a scaled version of Equation (1), may be implemented by selecting values of resistors for each of the components of ASVC 22 to provide the following ratios: $R_1/R_2 = 2.5$; $R_8/R_5 = 0.4572$; $R_8/R_6 = 2.030$; $R_8/R_7 = 12.675/15$; $R_8'/R_5' = 5.126$; $R_8'/R_6' = 0.3392$; $R_8'/R_7' = 16.813/15$; $R_8''/R_5'' = 1.837$; $R_8''/R_6'' = 1.00$.

Referring to FIG. 8, there is shown ASVC 22, modified by the provision of adjustable means for reducing error in the output voltage of each of the analog circuits to within selected limits, the output errors resulting from error in the respective input resistances thereto.

The adjustable means comprise variable resistors 38–54, which may comprise conventional trimpots, and are connected in series with the input resistors of their respective analog circuits. Each resistor 38–54 is adjusted to maintain the output voltage of its respective analog circuit within the range indicated by the defining equation thereof:

For analog circuit 28, output voltage $$V_{28} = -2.5V_n - 0.75 V, \geq V_{28} \geq -10V.$$

For analog circuit 34a, output voltage
$$V_{34a} = (12.675 - 2.030 \, V_8 - 0.4572 \, V_l),$$

$$4.249 \, V \leq V_{34a} \leq 10.0 \, V.$$

For analog circuit 34b, output voltage $$V_{34b} = (16.813 - 5.126 \, V_n - 0.3392 \, V_2),$$

$$-1.543 \, V \leq V_{34b} \leq 10.406 \, V.$$

For analog circuit 34c, output voltage $$V_{34c} = 1.837 \, V_{26} - (1)(V_{34b}),$$

$$-9.028 \leq V_{34c} \leq 9.347,$$

where $V_{26}$ is the output of multiplier 26.

FIG. 8 also shows a variable resistor 56 coupled between the "Z" terminal of multiplier 26 and the output thereof, for reducing error, $$V_{26} = 1/10 \, (V_{28})(V \, 34a), \; -3.187V \geq V_{26} \geq -10V.$$

Obviously, many modifications and variations of the present invention are possible in the light of the above teachings, and, it is therefore understood that the invention may be practiced otherwise than as specifically described.

What is claimed is:

1. Apparatus for enabling the passive determination of the velocity of sound at various levels in a liquid media comprising:
   means for passively sensing the temperature, conductivity, and depth of the liquid media at various levels;
   means for representing said sensed temperature in the form of a first voltage, for representing said sensed conductivity in the form of a second voltage, and for representing said sensed depth in the form of a third voltage;
   analog calculating means receiving said first, second, and third voltages for providing an analog output voltage in real time which represents the velocity of sound at said levels.

2. An apparatus for enabling the determination of sound at various levels in a liquid media comprising:
   means for passively sensing the temperature, conductivity, and depth of the liquid media at various levels;
   means for representing said sensed temperature in the form of a first voltage, for representing said sensed conductivity in the form of a second voltage, and for representing said sensed depth in the form of a third voltage;
   analog calculating means receiving said first, second, and third voltages for providing an analog output voltage which represents the velocity of sound at said levels, said analog calculating means comprising:
   a first analog means receiving said first voltage for providing a fourth voltage, which comprises said first voltage multiplied by a first constant;
   a second analog means receiving said first voltage and said second voltage for providing a fifth voltage which comprises the sum of: said first voltage multiplied by a second constant, said second voltage multiplied by a third constant, and a fourth constant;
   a third analog means receiving said fourth voltage and said fifth voltage for providing a sixth voltage which comprises the product of: said fourth voltage, said fifth voltage, and a fifth constant;
   a fourth analog means receiving said second voltage and said third voltage for providing a seventh voltage which comprises the sum of: said second voltage multiplied by a sixth constant, said third voltage multiplied by a seventh constant, and an eighth constant;
   a fifth analog means receiving said sixth voltage and said seventh voltage for providing said analog output voltage representing said sound velocity, said analog output voltage comprising the sum of: said sixth voltage multiplied by a ninth constant and said seventh voltage; and
   said first analog means comprises a first operational amplifier, a first resistor coupled in parallel with said first operational amplifier, and a second resistor coupled in series with said first operational amplifier, said first constant comprising the ratio of said first resistor to said second resistor.

3. The apparatus of claim 2 wherein:
said second analog means includes a second operational amplifier, a third resistor coupled in parallel with said second amplifier, and fourth and fifth resistors coupled in series with said second operational amplifier, said second constant comprising the ratio of said third resistor to said fourth resistor and said third constant comprising the ratio of said third resistor to said fifth resistor.

4. The apparatus of claim 3 wherein:
said fourth analog means includes a third operational amplifier, a sixth resistor coupled in parallel with said third operational amplifier, and seventh and eighth resistors coupled in series with said third operational amplifier, said sixth constant comprising the ratio of said sixth resistor to said seventh resistor, and said seventh constant comprising the ratio of said sixth resistor to said eighth resistor.

5. The apparatus of claim 4 wherein:
said fifth analog means includes a fourth operational amplifier, a ninth resistor coupled in parallel with said fourth operational amplifier, and a tenth resistor coupled in series with said fourth operational amplifier, said ninth constant comprising the ratio of said ninth resistor to said tenth resistor.

6. The apparatus of claim 5 wherein:
said first and second resistors are respectively selected so that said first constant is 2.5.

7. The apparatus of claim 6 wherein:
said third, fourth, and fifth resistors are respectively selected so that said second constant is 0.4572 and said third constant is 2.030, said fourth constant being 12.675.

8. The apparatus of claim 7 wherein:
said sixth, seventh and eighth resistors are respectively selected so that said sixth constant is 5.126 and said seventh constant is 0.3392, said eighth constant being 16.813; said ninth and tenth resistors are respectively selected so that said ninth constant is 1.837 and;

said third analog means is selected so that said fifth constant is 0.1.

9. The apparatus of claim 3 wherein:

said passive sensing means includes a free-fall probe which is dropped through a succession of levels in said liquid media for passively sensing the temperature and conductivity of said liquid media at each of said levels and the depth of each level;

said analog calculating means receives said first, second and third voltages for providing a succession of output voltages which represent the sound velocity at each of said successive levels; and a graphic recording system receives each of said output voltages for providing a graphic representation of the sound velocity at said levels and the depth of each of said levels.

10. The apparatus of claim 9 wherein said apparatus is adapted to provide said graphic representation in real time.

11. The apparatus of claim 10 wherein: said free-fall probe is adapted to drop through said liquid media at a constant rate, and said apparatus is adapted to calculate and represent said sound velocity at selected time intervals as said probe is dropping.

12. The apparatus of claim 11 wherein:

said liquid media comprises an ocean body.

* * * * *